US008989690B2

(12) United States Patent
Devries et al.

(10) Patent No.: US 8,989,690 B2
(45) Date of Patent: Mar. 24, 2015

(54) METHOD AND APPARATUS FOR INTERFERENCE MEASUREMENT AND RESPONSE

(71) Applicant: Research In Motion Limited, Waterloo (CA)

(72) Inventors: Christopher Andrew Devries, Kitchner (CA); Daniel Noel Badiere, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/768,492

(22) Filed: Feb. 15, 2013

(65) Prior Publication Data

US 2013/0165067 A1 Jun. 27, 2013

Related U.S. Application Data

(63) Continuation of application No. PCT/CA2011/000545, filed on May 12, 2011.

(51) Int. Cl.
*H04B 1/10* (2006.01)
*H04B 1/12* (2006.01)

(52) U.S. Cl.
CPC .............. *H04B 1/123* (2013.01); *H04B 1/1036* (2013.01)
USPC ......... 455/296; 455/226.1; 455/323; 455/334

(58) Field of Classification Search
CPC ..... H03D 7/00; H03G 3/3052; H03G 3/3068; H04B 1/30; H04B 1/28; H04B 1/1027
USPC .............. 455/234.2, 296, 307, 313, 314, 323, 455/334, 337, 132, 133, 135, 161.1, 165.1, 455/226.1

See application file for complete search history.

(56) References Cited

U.S. PATENT DOCUMENTS

| 6,718,166 | B2 | 4/2004 | Cordone |
| 7,194,050 | B2* | 3/2007 | Nicholls et al. ............... 375/346 |
| 7,760,831 | B2* | 7/2010 | Pirzada et al. ................ 375/350 |
| 2003/0216122 | A1 | 11/2003 | Cordone |
| 2006/0229030 | A1* | 10/2006 | Simon et al. .................... 455/78 |
| 2007/0213019 | A1 | 9/2007 | Devries et al. |
| 2008/0309430 | A1 | 12/2008 | Tsuzuki et al. |

OTHER PUBLICATIONS

PCT application No. PCT/CA2011/000545, International Search Report and Written Opinion of the International Searching Authority, mailed Sep. 21, 2011.
"An Integrated, Tunable RF Filter: an Enabler for Reconfigurable Front-Ends" by Tom Riley, Jim Wight, Seste Dell'Aera (2009) url: http://www.design-reuse.com/articles/?id=19391&print=yes.

(Continued)

*Primary Examiner* — Nhan Le
(74) *Attorney, Agent, or Firm* — Moffat & Co.

(57) ABSTRACT

A radio frequency front end of a receiver including a tunable filter receiving a signal; a controller for tuning the tunable filter; and an interference detection circuit configured to detect interference and provide an input to a controller, wherein the controller tunes the tunable filter based on the input from the interference detection circuit. Also a method for removing interference at a radio frequency front end of a receiver, the method detecting interference at an interference detection circuit; and tuning at least one tunable filter to at least one frequency of the detected interference.

22 Claims, 12 Drawing Sheets

(56) References Cited

OTHER PUBLICATIONS

"Reconfigurable Radio Architecture" (retrieved on Apr. 4, 2011) url: http://kabenwireless.com/kaben-wireless/technology.html.

"RF front-ends for GSM mobile handsets continue down path of integration" by Scott Smyer (Apr. 12, 2004). url: http://www.eetimes.com/electronics-news/4048543/RF-front-ends-for-GSM-mobile-handsets-continue-down-path-of-integration.

"An Approach of RF-MEMS Technology Platform for Multi-band Multi-mode Handsets" by Christophe Pavageau, Olivier Millet, Ariel Cao (2011)—Retreived Apr. 7, 2011 url: http://www.memsindustrygroup.org/files/DelfMEMS_approach_for_RF_MEMS_platform.pdf.

"RF MEMS tunable capacitor applications in mobile phones" by Qizheng Gu De Luis, J.R. (Nov. 1-4, 2010) (abstract only). url: http://ieeexplore.ieee.org/Xplore/login.jsp?url=http%3A%2F%2Fieeexplore.ieee.org%2Fiel5%2F5658734%2F5667273%2F05667298.pdf%3Farnumber%3D5667298&authDecision=-203.

"Tunable filters based on metal-dielectric resonators", by Borys Pratsiuk et al, 18th International Conference on Microwave, Radar and Wireless Communications MIKON-2010, Jun. 14-16, 2010.

"MEMS Technologies and Devices for Single-Chip RF Front-Ends" by Clark T.-C. Nguyen (2005) http://www.eecs.berkeley.edu/~ctnguyen/Research/ConferencePubs/2006/Plenary.cicmt06.ctnguyen.web.pdf.

"High Linearity 1.5-2.5 GHz RF-MEMS Tunable Filters for Wireless Applications" by Mohammed A. El-Tanani and Gabriel M. Rebeiz (May 29, 2009) url: http://cwc.ucsd.edu/research/file.php?file=Li9yZXZpZXdzLz1wMDkwNTI5X3B1YmxpYy9DV0NfUmVzZWFyY2gtUmV2aWV3X3XzlwMDkwNTI5X1JIYmVpekcucGRM.

"Receiver Front-End Circuits for Future Generations of Wireless Communications" by Mihai A. T. Sanduleanu, Arthur H. M. van Roermund Tasic, Member, IEEE (Apr. 2008) (abstract only).

"Adaptive Narrowband Interference Suppression in Multiband OFDM Receivers" by Burak Kelleci, Timothy Wayne Fischer, Aydin Ilker Kar Karşilayan ilayan, Kai Shi and Erchin Serpedin (2007) url: http://www.springerlink.com/content/w277846002628411/abstract/?target=print.

"Narrowband Interference Suppression in Multi-Band OFDM Ultra Wideband Communication Systems: A Mixed-Mode Approach" by Kelleci, B. Fischer, T.W. Shi, K. Yi Zhou Karsilayan, A.I. Serpedin, E. (Sep. 24-27, 2006) (abstract only). url: http://ieeexplore.ieee.org/xpareeabs_all.jsp?arnumber=4041031.

"Flexible Frequency Discrimination Subsystems for Reconfigurable Radio Front Ends" by Bruce E. Carey-Smith; Paul A.Warr; Phill R. Rogers; Mark A. Beach; Geoffrey S. Hilton (2005) url: http://front.cc.nctu.edu.tw/Richfiles/14372-GetPDF.aspxgetpdf.pdf.

"Active cancellation of acoustic noise using a self-tuned filter" by Goel, A. Vetteth, A. Rao, K.R. Sridhar, V. Univ. of Southern California, Los Angeles, CA, USA (Nov. 2004) (abstract only). url: http://ieeexplore.ieee.org/iel5/8919/29782/01356146.pdf?arnumber=1356146.

IBM, WiSpry teamed on tunable RF MEMS by R. Colin Johnson (Jun. 28, 2010) url: http://www.eetimes.com/electronics-news/4200792/IBM—WiSpry-teamed-on-tunable-RF-MEMS.

wiSpry, Mobile Handsets—Tunable RF—An Enabling Wireless Technology (2009) url: http://www.wispry.com/market-multiband.php.

"RF-MEMS for Wireless Communications" by Jeffrey L. Hilbert (Aug. 2008) http://wispry.com/admin/pdf/1253223480_IEEE_Magazine_08.2008.pdf.

"Analysis and Design of an Integrated Notch Filter for the Rejection of Interference in UWB Systems" by Vallese, A.; Bevilacqua, A.; Sandner, C.; Tiebout, M.; Gerosa, A.; Neviani, A.; Dipt. di Ing. dell 'Inf., Univ. di Padova, Padova., Feb. 2009 (abstract only). url: http://ieeexplore.ieee.org/xpl/freeabs_all.jsp?arnumber=4768866.

"A Blocker Filtering Technique for SAW-Less Wireless Receivers" by Darabi, H., Dec. 2007 (abstract only) url: http://eeexplore.ieee.org/xpl/freeabs_all.jsp?arnumber=4381445.

Solicitation for Proposals—U. S. Department of Defence Small Business Innovation Research: "Tunable Bandstop Filters for Suppression of Co-site Interference and Jamming Sources" Solicitation Period: Opens: Feb. 28, 2011—Closes: Mar. 30, 2011 http://www.navysbir.com/n11_A/nayst11-016.htm.

A 65 nm CMOS Quad-Band Saw-Less Receiver SoC for GSM/CPRS/EDGE by Mirzaei, A. Darabi, H. Yazdi, A. Zhou, Z. Chang, E. Suri, P. Broadcom Corporation, Irvine (Apr. 2011) (abstract only). http://ieeexplore.ieee.org/xpl/freeabs_all.jsp?arnumber=5723772.

"A wide-band RF front-end with linear active notch filter for mobile TV applications" by Seung Hwan Jung; Kang Hyuk Lee; Young Jae Lee; Hyun Kyu Yu; Yun Seong Eo, May 23-25, 2010 (abstract only). url: http://ieeexplore.ieee.org/xpl/freeabs_all.jsp?arnumber=5477293.

"Frequency agile RF feedforward noise cancellation system" by Roussel, A. Nicholls, C.W.T. Wight, J.S. (Jan. 22-24, 2008) (abstract only). url: http://ieeexplore.ieee.org/stamp/stamp.jsp?tp=&arnumber=4463440.

European Patent Office, European Search Report, Ref No. 40863-EP-EPT, Sep. 5, 2014.

\* cited by examiner

METHOD AND APPARATUS FOR INTERFERENCE MEASUREMENT AND RESPONSE

CROSS-REFERENCE TO RELATED APPLICATIONS

The present application is a continuation of International Application PCT/CA2011/000545, filed May 12, 2011, the entire contents of which are incorporated herein by reference.

FIELD OF THE DISCLOSURE

The present disclosure relates to receivers and in particular to the radio frequency front end of a receiver.

BACKGROUND

As mobile technology evolves, mobile devices often need to tune to multiple bands in order to successfully receive signals. The radio frequency (RF) front end of a mobile device may require many fixed bands to be supported and needs to tune to these bands.

Many mobile devices use surface acoustic wave (SAW) filters in order to proper tune to a band. A SAW filter permits only the signal in the band being filtered and removes all other interference. However, a SAW filter is not tunable and a device required to receive signals on multiple bands will need multiple SAW filters. As devices require more and more bands for reception, this becomes problematic for both the cost and the space required within the mobile device.

Radio frequency integrated circuits generally cannot handle or remove interference out-of-band without off-chip filtering. A tunable duplexer allows tuning to a desired band, but may have very light filtering of the receive (RX) band compared to a SAW filter. For example, a second order band pass filter with a Q of 15 has as little as 5 dB band edge rejection. Also, because a duplexer will tune from one band to another, the RX rejection in nearby bands will not be good enough since it is very difficult to tune into one band and then reject the entire band in a future tuning.

BRIEF DESCRIPTION OF THE DRAWINGS

The present disclosure will be better understood with reference to the drawings, in which.

DETAILED DESCRIPTION OF THE DRAWINGS

The present disclosure provides a radio frequency front end of a receiver comprising: a tunable filter receiving a signal; a controller for tuning the tunable filter; and an interference detection circuit configured to detect interference and provide an input to a controller wherein said controller tunes said tunable filter based on the input from said interference detection circuit.

The present disclosure further provides a method for removing interference at a radio frequency front end of a receiver, the method comprising: detecting interference at an interference detection circuit; and tuning at least one tunable filter to at least one frequency of the detected interference.

Reference is now made to the drawings. As indicated above, a tunable duplexer may have very light filtering or no filtering at all of the frequency bands close to the RX band compared to a SAW filter, where out-of-band rejection is met by design.

Figure 1:
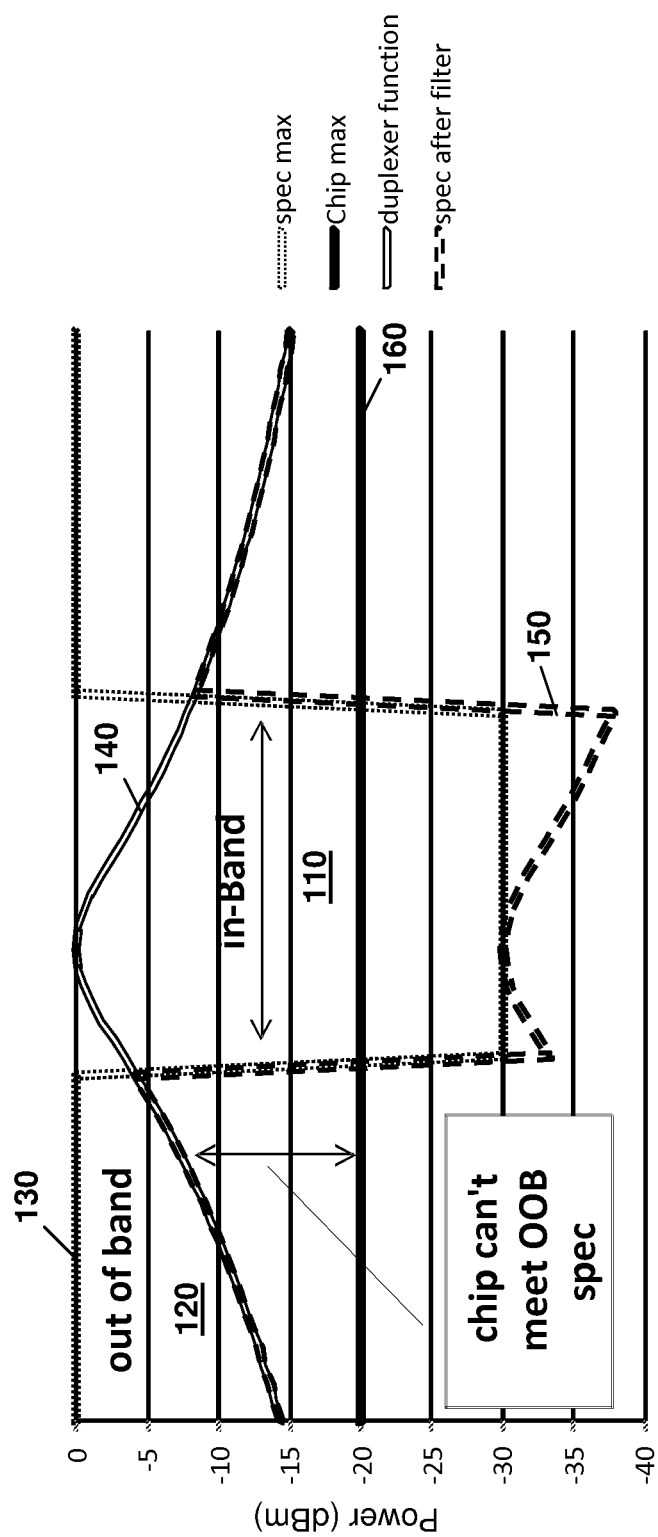
FIG. 1 is a plot of the power of a sample signal using duplexer filtering.

Referring to FIG. 1, which shows a plot of a filtering specification. An in-band portion 110 shows the desired area for the receiver whereas an out-of-band (OOB) portion 120 shows the area that might have interference that causes problems with the reception of the in-band signal.

In the plot of FIG. 1, line 130 shows the ideal specification for the filtering of out-of-band signals. Line 140 shows an example duplexer transfer function from the antenna to the RX port. Line 150 shows the specification after filtering. Line 160 shows the chip maximum capability.

As seen in FIG. 1, the out-of-band region 120 still has a signal above the chip max of line 160 after the filtering. The receiver will therefore be unable to receive the signals properly.

In accordance with one embodiment of the present disclosure, a simple notch or other filter can remove large out-of-band interference. However, such a notch filter or other filter cannot remove interference from all possible out-of-band signals at the same time.

The disclosure therefore provides for a system that can measure incoming interference and tune a notch filter to filter interference dynamically.

As will be appreciated by those skilled in the art having regard to the present disclosure, a notch filter can remove the specific interference out-of-band. Further, the notch filter frequency will allow the specification to be met at the frequency where the notch is placed. However, time and frequency of out-of-band interference is unknown and when interference first becomes active a receiver may no longer function, losing the signal.

Figure 2:
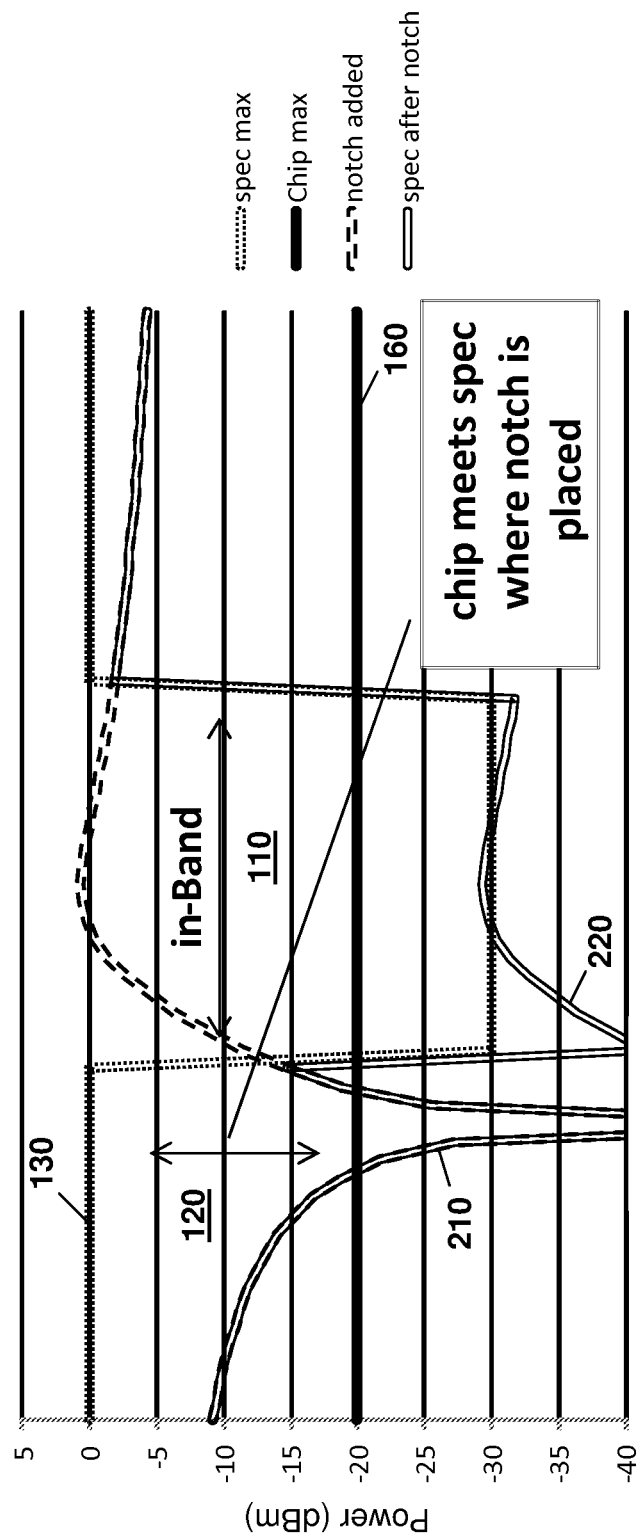
FIG. 2 is a plot of the power of a sample signal using duplexer and notch filtering.

Reference is now made to FIG. 2, which shows a plot of the signal of FIG. 1 with a notch added.

As seen, an in-band area 110 represents the band that the receiver is tuned to. Out-of-band area 120 shows the area that may cause interference.

Further, specification max line 130 remains the same and the chip max line 160 remains the same.

The filter with the notch added is shown by line 210 and the specification after the notch added is shown by line 220.

As seen, line 220 has an out-of-band area that meets the receiver specification where the notch is placed.

The present disclosure therefore provides for a system in which a filter, such as a notch filter, may be tuned to the interference or dominant interference frequency.

Figure 3:
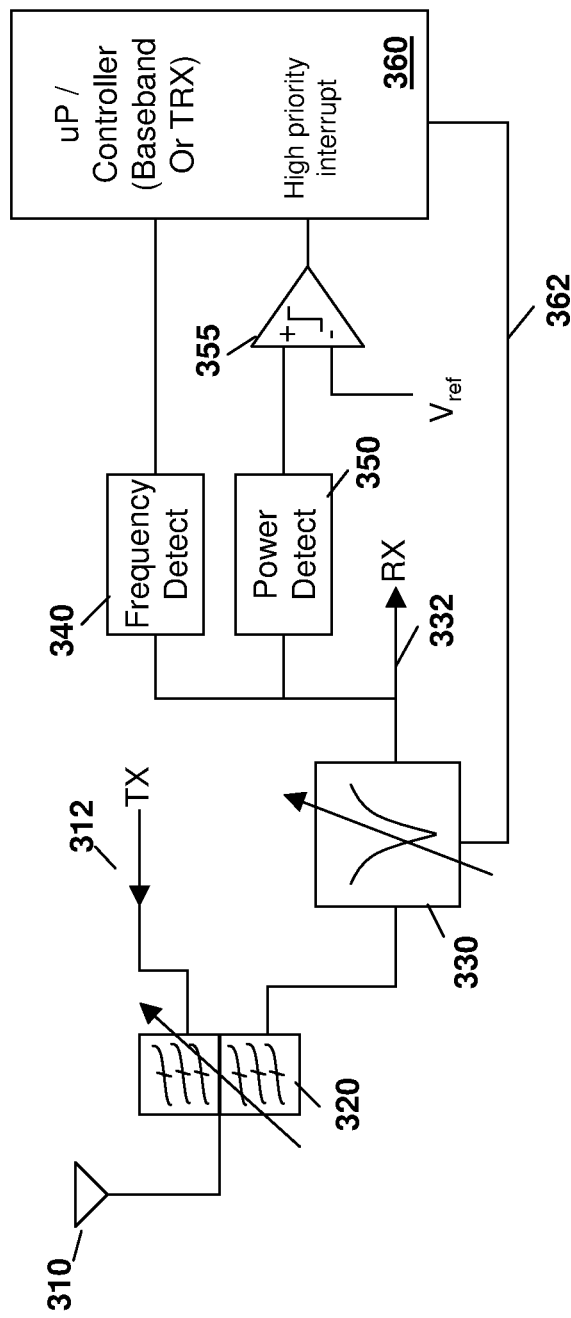
FIG. 3 is a block diagram of a radio frequency front end of a mobile device receiver having a duplexer and tunable notch filter.

Reference is now made to FIG. 3, which shows one exemplary architecture for the apparatus of the present disclosure. The example of FIG. 3 is provided with regard to the radio frequency (RF) front end of a mobile device. However, this is merely an example and other receiver circuits, both mobile and fixed, could use the embodiments of the present disclosure.

In FIG. 3, an antenna 310 interacts with a duplexer 320. As will be appreciated, duplexer 320 ensures that the transmitter signals from a transmitter circuit 312 do not leak into receiver signals. In the embodiment of FIG. 3, duplexer 320 is a tunable duplexer, which allows for the tuning of the radio frequency front end of a mobile device. However, in some embodiments duplexer 320 may not perform any tuning or very light tuning functionality. In further embodiments where no transmitter is utilized, duplexer 320 may be omitted completely.

A received signal passes through duplexer 320 and is further propagated to a tunable filter 330, as described below. In the embodiment of FIG. 3, tunable filter 330 is a notch filter. However, in other embodiments, other filters such as a band-stop filter or any other filter that removes frequency and is tunable may be used and the present disclosure is not limited to a notch filter. Such filters could include higher order or cascaded filters as well. A notch filter is used below merely as an example.

The output of notch filter 330 proceeds to a standard receiver, as shown by arrow 332. Further, the same output proceeds an interference detection circuit. In the embodiment of FIG. 3, interference detection circuit includes a frequency detector 340 and a power detector 350. In alternative embodiments, interference detection may occur utilizing other components, including analog, digital or both, to detect interference.

Power detector 350 is used to trigger the controller to act as soon as interference is detected. A voltage reference is compared to the signal from the power detector to trigger a high priority interrupt at a controller 360. The comparator 355 may use a reference signal, such a voltage Vref signal, to represent a value within the comparator 355, such as −25 dBm, to compare the signal from the power detector to determine whether to trigger the high priority interrupt at controller 360.

Controller 360 provides a signaling line 362 to tunable notch filter 330 in order to tune the notch filter. Such tuning may include frequency, linearity or noise figure, among other parameters.

The frequency detection circuit 340 is used to quickly give an accurate measurement of the interference frequency. The frequency detector may, in some instances, provide a rough measurement, such as within 5 megahertz, to allow for the quick adaptation of the circuit for the interference.

Controller 360 takes the interrupt and uses the signaling line 362 to tune notch filter 330. In one embodiment this may be done through the use of a pre-calibrated look-up table at controller 360. Such a pre-calibrated look-up table may include tuning and notch frequencies that are known and calibrated.

The power detector and frequency detector work quickly enough to allow for the link to be maintained and the bit error rate (BER) performance to be acceptable for the communication link.

Therefore, based on the above, a signal is received at antenna 310 and, in one embodiment, partial filtering to the desired band is done at duplexer 320.

The notch filter may be arbitrarily set initially.

Figure 4:
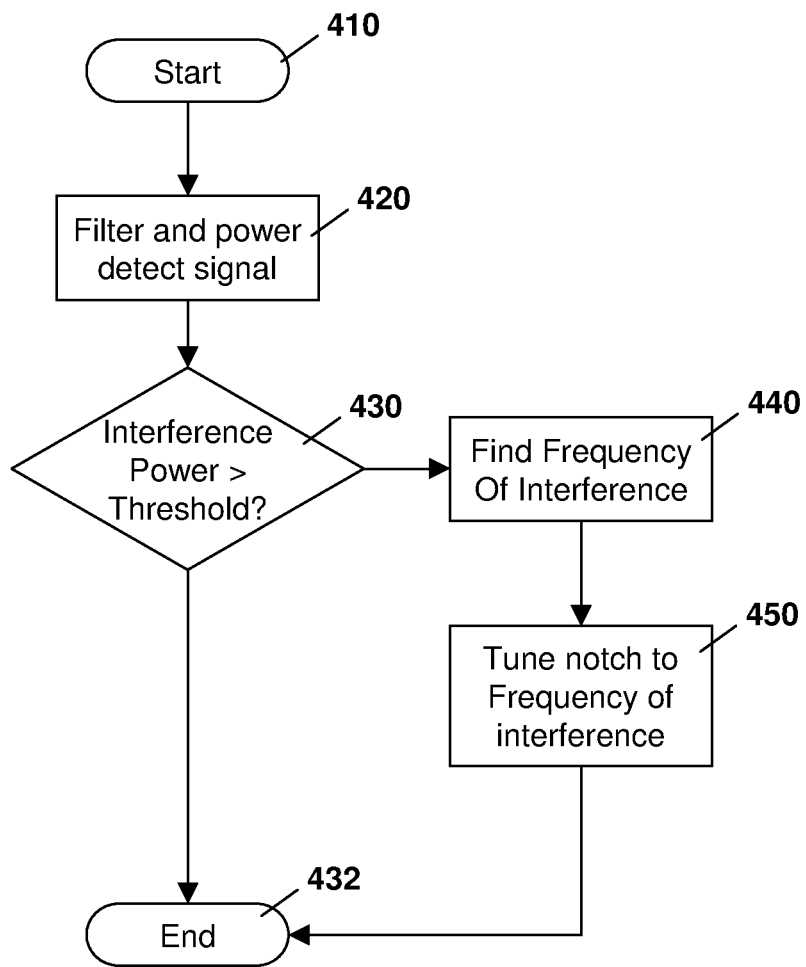
FIG. 4 is a process diagram showing a method for dynamically tuning a filter to interference.

Reference is now made to FIG. 4. FIG. 4 shows a diagram showing a method for the present disclosure.

The process of FIG. 4 starts at block 410 and proceeds to block 420 in which the signal is filtered and power detected.

The process then proceeds to block 430 in which a check is made to determine whether any interference power is greater than a threshold. If no the process ends at block 432. Conversely, the process could continue to loop at block 420 until interference is detected.

If the check at block 430 finds that there is interference with a power greater than a threshold, the process proceeds to block 440 in which the frequency of the interference is found. The process then proceeds to block 450 in which the notch filter is tuned to the frequency of the interference and the process then proceeds to block 432 and ends. Conversely, the process could continue to loop at block 420 and continue to detect for interference. The notch filter should have at this point removed the interference found at block 430, but if the frequency of interference changes or if a new interference frequency appears, then the process will update the notch filter tuning once again.

In some embodiments, if the check at line 430 finds that there is a power greater than the threshold, it is possible that this power is due to the desired signal in-band. In this situation it may be necessary to introduce another decision point whereby the controller checks to see if the high signal power is the desired signal, in which case the process continues as if the answer to 430 is no.

Referring again to FIG. 3, various options for the circuit exist. In one embodiment, frequency detector 340 could selectively be turned on and off. Specifically, frequency detector 340 may draw significant power and, in order to save battery resources, in one embodiment the frequency detector could remain off until power detector 350 detects an interference power above a given threshold. The frequency detector 350 could then be activated and provide the controller 360 with the frequency of the interference.

The embodiment of FIG. 3 is also not limited to a single tunable filter. In particular, multiple filters could be provided for the canceling of multiple interference sources. In such an embodiment, the above apparatus of FIG. 3 could be cascaded to provide for multiple filters. Further, higher order filters with multiple notches or nulls could equally be used with the embodiments of the present disclosure.

Figure 5:
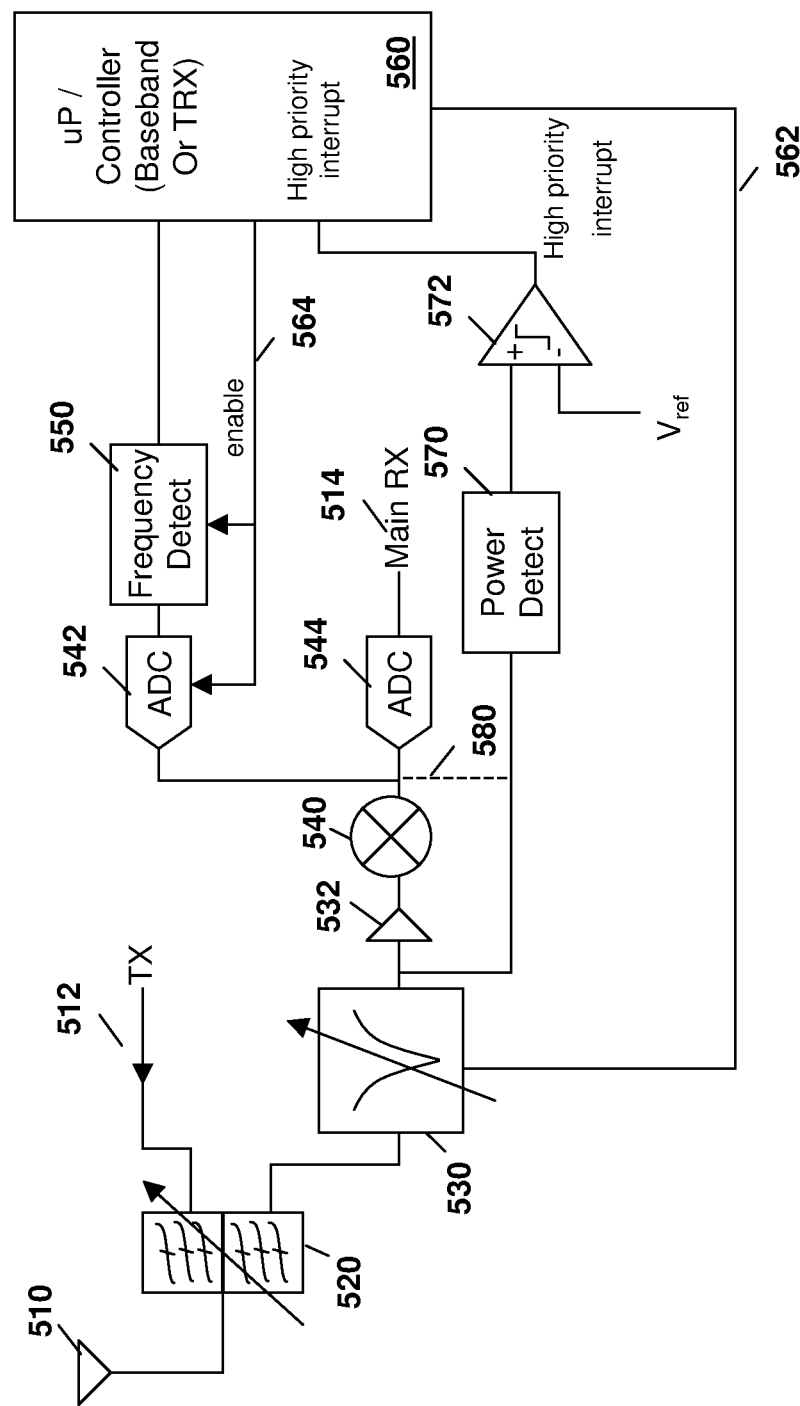
FIG. 5 is a block diagram of a radio frequency front end of a mobile device receiver having a digital frequency detector.

In other embodiments, some functionality could be performed digitally. Reference is now made to FIG. 5, which shows an example of a tunable notch filter and duplexer utilizing digital frequency detection. Specifically, the RF front end in the example of FIG. 5 includes an antenna 510.

A duplexer 520 provides for the separation of a transmitter 512 and receiver 514. In one embodiment, duplexer 520 may be tunable, which allows for band selection. A tunable notch filter 530 provides for interference filtering.

The output of notch filter 530 is provided to a low noise amplifier 532 and mixer 540. The signal is then converted to a digital signal at analog to digital converters 542 and 544.

The output from analog to digital converter 544 goes to the main receiver 514.

The output from analog to digital converter 542 is provided to a frequency detector 550.

The output of frequency detector 550 is provided to controller 560.

Notch filter 530 further provides an output to a power detector 570. Power detector 570 then provides an output to comparator 572, which determines when a high priority interrupt should be provided to controller 560.

In the embodiment of FIG. 5, a control line 562 is provided to notch filter 530. The controller may use a look-up table or other way to determine how to configure notch filter 530 to tune to the frequency detected at frequency detector 550, and to further potentially tune other parameters of notch filter 530. For example, the notch filter may have a mode whereby the linearity performance is higher, but power consumption is also higher. It would be advantageous to enable this mode only once a large interference is detected.

Further, an enablement control line 564 is provided to frequency detector 550 and analog to digital converter 542 to turn off these components when the power detector has not detected interference above a certain threshold.

In an optional embodiment, the input to power detector 570 may be provided after mixer 540, as shown by dotted line 580.

As will be appreciated by those in the art having regard to the above, the embodiment of FIG. 5 requires an extra, high bandwidth receive path to digitize the out-of-band interference and determine frequency with digital methods such as Fast Fourier Transform (FFT). A low dynamic range will likely be sufficient and even a heavily saturated signal may be used to detect frequency.

Figure 6:
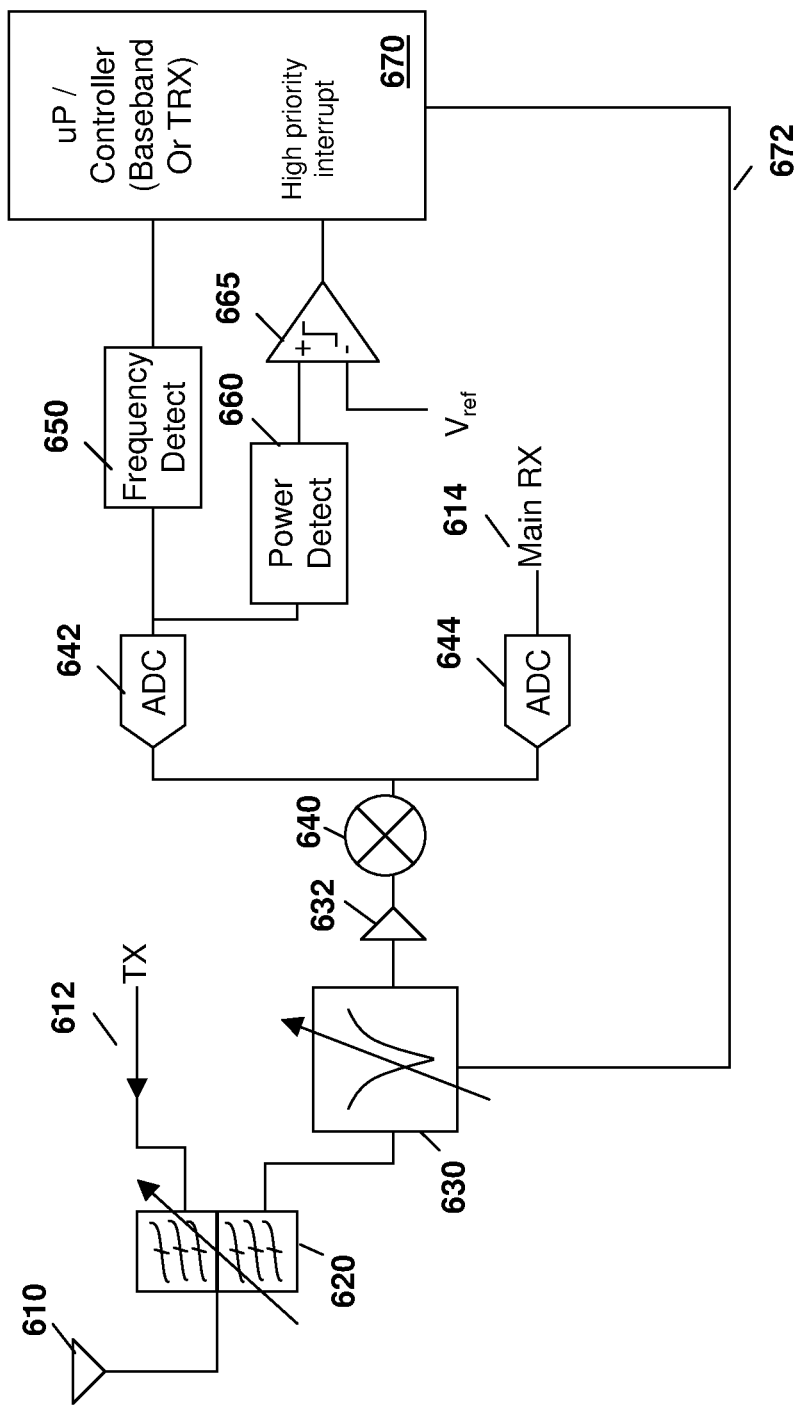
FIG. 6 is a block diagram of a radio frequency front end of a mobile device receiver having a digital frequency and power detector.

In a further alternative embodiment, the power detector could use the digital signals as well. Reference is now made to FIG. 6, which shows a circuit including an antenna 610 interacting with a duplexer 620. Duplexer 620 separates signals from transmitter 612 and receiver circuit 614.

The output from the duplexer 620 proceeds to a tunable notch filter 630. The tunable notch filter then provides its output to a low noise amplifier 632 and mixer 640. The signal is then digitally converted at analog to digital converters 642 and 644.

The output from analog to digital converter 644 is provided to the main receiver 614.

The output from analog to digital converter 642 is provided to a frequency detector 650 and a power detector 660.

The output from power detector 660 is provided to a comparator 665, which is then provided to a controller 670.

Frequency detector 650 also provides its output to controller 670.

Controller 670 includes a control line 672 which controls notch filter 630 similarly to the embodiments described above with regard to FIG. 3 and FIG. 5.

With regard to the embodiment of FIG. 6, an all digital implementation may provide the lowest cost solution. However, it relies on very low power digital detection over a wide bandwidth. The wideband analog to digital converter will need to be on all the time which may have a higher power consumption that the solutions of FIG. 3 and FIG. 5.

Figure 7:
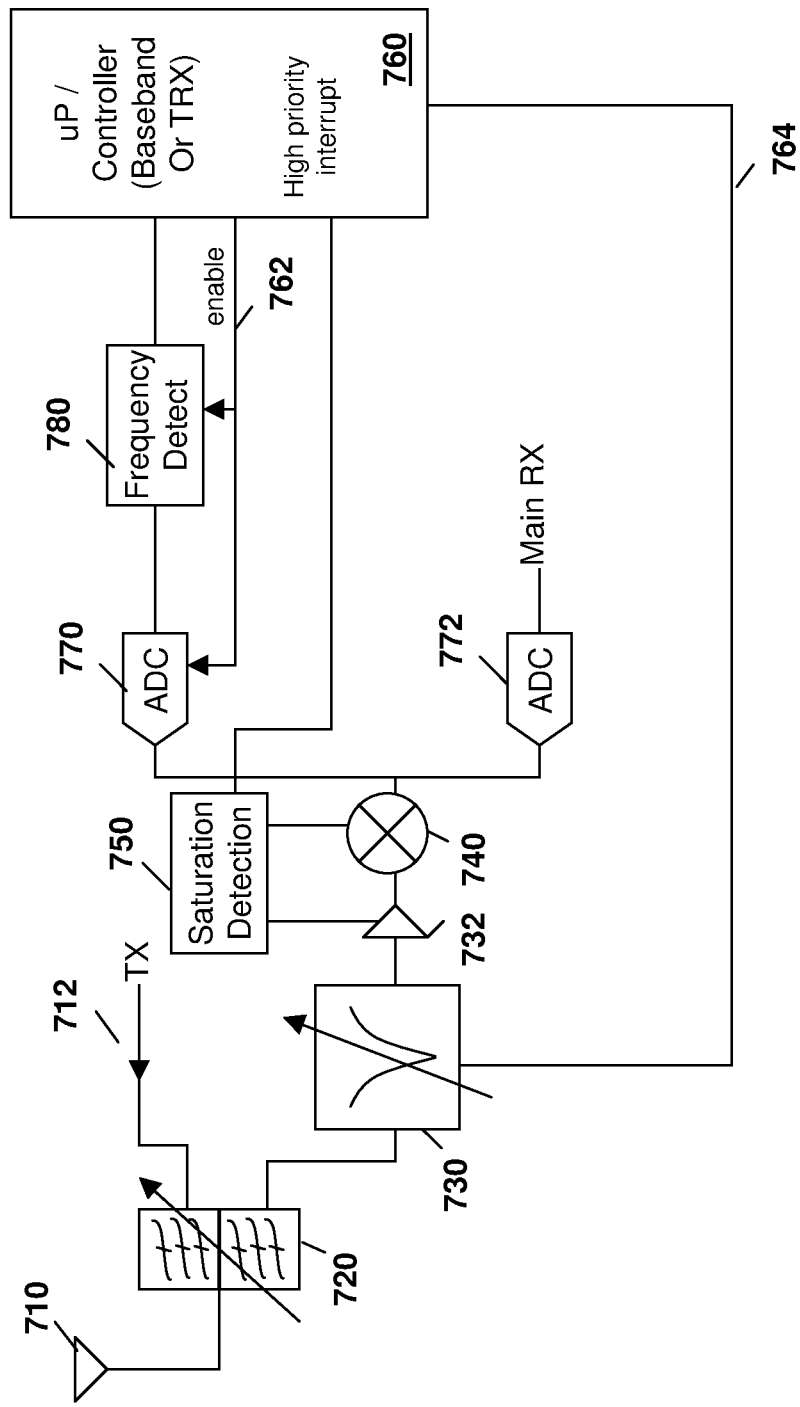
FIG. 7 is a block diagram of a radio frequency front end of a mobile device receiver having a digital frequency detector and a saturation detector.

Further, saturation of the radio frequency amplifier and mixer could limit the ability to detect the power. However saturation on the circuits could be enough to detect high power interference. Reference is now made to FIG. 7.

As seen in FIG. 7, the power detector is replaced with a saturation detector.

In particular, an antenna 710 interacts with a duplexer 720. Duplexer 720 separates signals from transmitter 712 and for receiver 714 and in one embodiment may be tunable. The output from duplexer 720 is provided to notch filter 730.

The output from notch filter 730 is provided to amplifier 732 and mixer 740.

A saturation detector 750 monitors for saturation from amplifier 732, mixer 740, or both amplifier 732 and mixer 740, and provides its output as an interrupt to controller 760. The saturation detector 750 may be an integral part of the circuitry of the amplifier or mixer, or could be a separate circuit entirely which detects the presence of non-linearity or saturation in the circuits. A saturation detector that is in integral part of the circuit could, for instance, be a circuit that detects a change in the bias currents, voltages, or both, of the circuits, due to a large input signal present.

The output from mixer 740 is provided to analog to digital converters 770 and 772. The output from analog to digital converter 772 is provided to the main receiver.

The output from analog to digital converter 770 is provided to a frequency detector 780. Frequency detector 780 provides its output to controller 760.

Controller 760 may have an enablement line 762 which will enable the analog to digital converter and frequency detector to reduce the battery consumption from these two components.

Further, a control line 764 is provided to tunable notch filter 730 to tune to the interference frequency. Further, as will be appreciated by those skilled in the art having regard to the present disclosure, other parameters such as the notch Q, linearity or noise figure, among others, could be adjusted over control line 764.

FIGS. 3, 5, 6 and 7 therefore provide for detection of interference having a certain power and the frequency of the interference. A filter can then be dynamically tuned based on the inference present to remove the interference and allow a receiver to decode in-band signals.

The above can be implemented with a variety of components. Exemplary components are provided below. However, these are only meant to be examples and those skilled in the art having regard to the present disclosure would appreciate that other components, including alternative power detectors, frequency detectors, tunable notch filters and non-tunable or tunable duplexers could be utilized with the present disclosure.

Power Detector

A power detector 350, 570, 660 or saturation detector 750, may detect that there is interference of a certain power.

A power detector is a known circuit and could be part of the main receiver or an existing circuit. Power detectors can be arbitrarily fast with some trade off between accuracy and speed. Power detectors generally have very lower power consumption.

Frequency Detector

Figure 8:
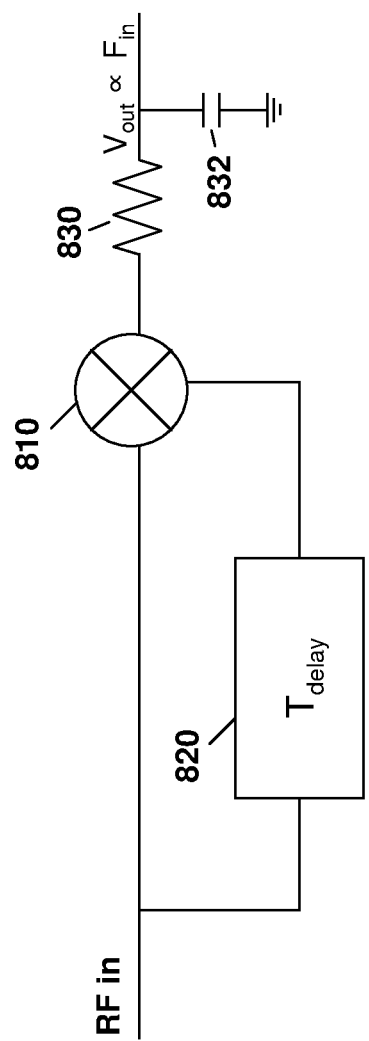
FIG. 8 is a block diagram of an exemplary frequency detector.

A frequency detector can detect the frequency of the interference. Reference is now made to FIG. 8, which shows an exemplary frequency detector. In the example of FIG. 8, a signal is mixed at a mixer 810 with a time delayed version of itself. A time delay circuit 820 causes the time delay.

A filter, such as a resistor and capacitor 830 and 832, filters the signals to determine the frequency. As will be appreciated, by multiplying the signal with a time delayed version of itself, the output direct current (DC) level is proportional to the frequency.

The time delay circuit 820 could be implemented in a variety of ways, and an integrated solution would typically be used in some embodiments. An integrated solution would have a better size and cost. Further, because the sensitivity requirements for the circuit are quite modest since the signals are quite large, the power consumption of this type of detector should be fairly low. For example, a passive mixer would likely be sufficient, meaning that active circuitry (if any) would be low frequency.

Even the analog digital converter (ADC) used to capture the frequency would only need to be as fast as the required response time. Further, the ADC capture could be triggered by the power detector.

Figure 9:
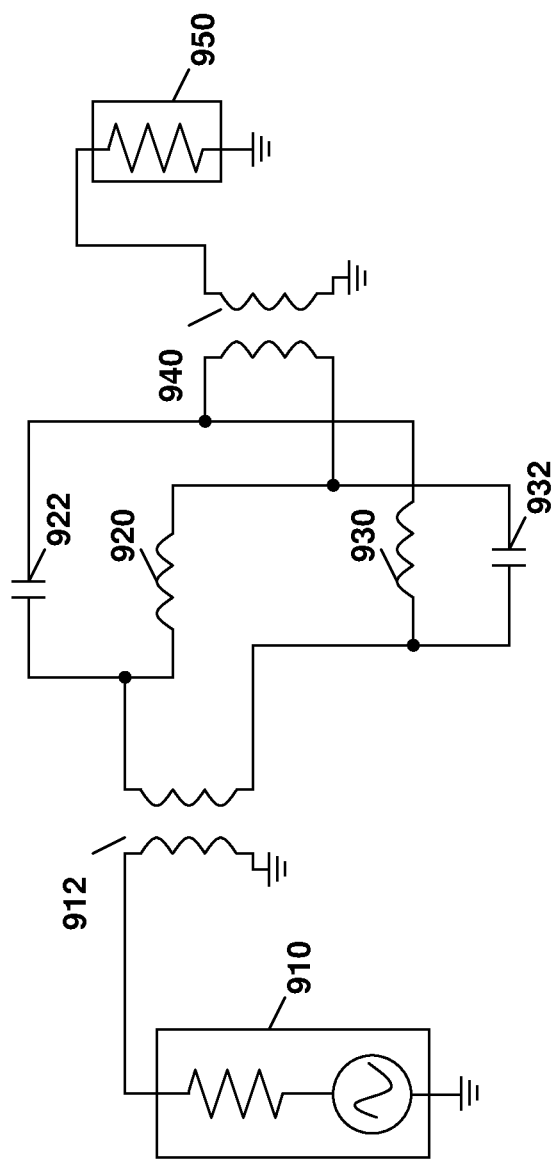
FIG. 9 is a schematic diagram of an exemplary time delay differential circuit.

One exemplary time delay is provided in FIG. 9. FIG. 9 shows a differential circuit having high bandwidth time delay.

FIG. 9 shows a port 910, the output of which is provided to a transformer 912. The output of transformer 912 is provided to a first inductor 920.

Further a capacitor 922 is provided.

A second inductor 930 and a second capacitor 932 are also provided.

The output from the first capacitor 922 and inductor 930 is provided to a first terminal of a transformer 940. The output from the first inductor 920 and the capacitor 932 is provided to the second terminal of transformer 940. The output from transformer 940 is provided as the output 950 from the time delay circuit.

Tunable Notch Filter

Various filters exist and could be used with the present disclosure. One exemplary notch filter is provided with regard to FIG. 10.

Figure 10:
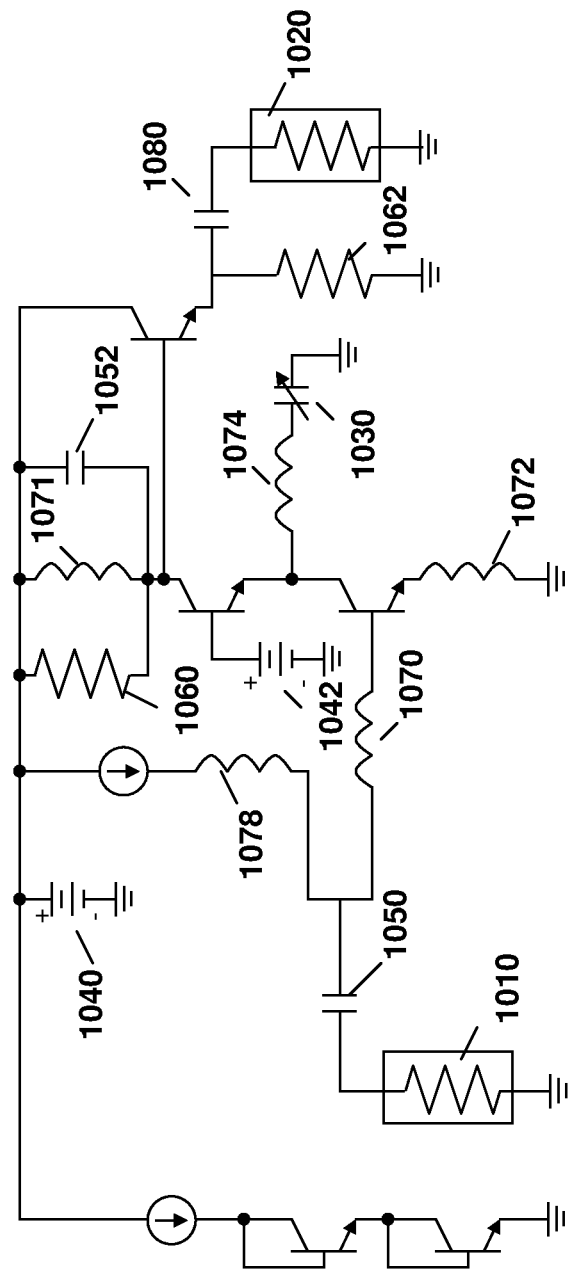
FIG. 10 is a schematic diagram of an exemplary tunable notch filter.

The notch filter of FIG. 10 includes a first terminal 1010 and a second terminal 1020.

A tunable capacitor 1030 provides for the tunability of the notch filter.

A first DC voltage 1040 and second DC voltage 1042 are further provided.

First capacitor 1050 and second capacitor 1052 may also be provided.

A first resistor 1060 and a second resistor 1062 are shown in the embodiment of FIG. 10.

Further, various inductors such as inductor 1070, second inductor 1072 and third inductor 1074 and further inductors 1071, 1076 and 1078, as well as capacitor 1080 are provided.

Tunable Duplexer

Figure 11:
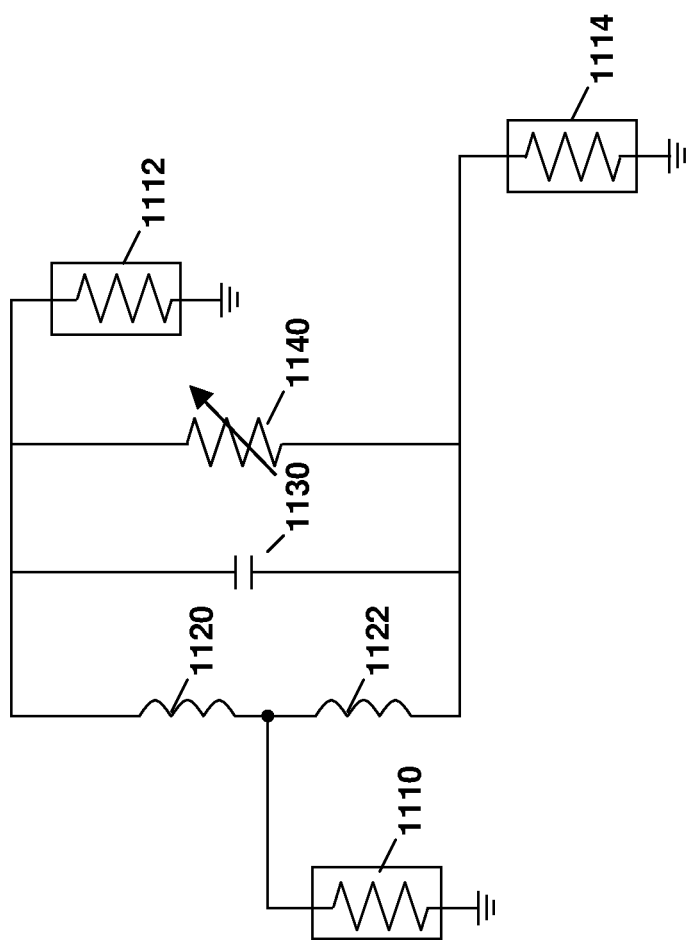
FIG. 11 is a schematic diagram of an exemplary tunable duplexer.

Various tunable duplexers may be used with the embodiments of the present disclosure and the present disclosure is not limited to any particular duplexer. Reference is now made to FIG. 11, which shows a duplexer with a first terminal 1110, a transmit terminal 1112 and an antenna terminal 1114.

Two inductors 1120 and 1122 are provided between the terminals and further a capacitor 1130 and resistor 1140 are provided between the terminals. In the embodiment of FIG. 11, resistor 1140 is variable to allow for tuning.

The examples of FIGS. 9, 10 and 11 are merely examples of various components that could be used with the present disclosure but are not limiting. Other embodiments of power detectors, tunable duplexers, notch filters and frequency detectors would be known to those in the art having regard to the present disclosure.

The above therefore provides a way to remove only the interference that exists rather than the entire spectrum of possible interference. In order to do this, interference is automatically detected and a rejection filter such as a notch filter is tuned to that frequency to remove the interference. The response to the interference dynamically provides for the removal of whatever interference arises for a signal.

The above can be performed on any mobile device. One exemplary mobile device is provided below with regard to FIG. 12.

Mobile device 1200 is typically a two-way wireless communication device having voice and data communication capabilities. Mobile device 1200 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 1200 is enabled for two-way communication, it will incorporate a communication subsystem 1211, including both a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate. The radio frequency front end of communication subsystem 1211 can be any of the embodiments described above.

Network access requirements will also vary depending upon the type of network 1219. In some networks network access is associated with a subscriber or user of mobile device 1200. A mobile device may require a removable user identity module (RUIM) or a subscriber identity module (SIM) card in order to operate on a CDMA network. The SIM/RUIM interface 1244 is normally similar to a card-slot into which a SIM/RUIM card can be inserted and ejected. The SIM/RUIM card can have memory and hold many key configurations 1251, and other information 1253 such as identification, and subscriber related information.

Figure 12:
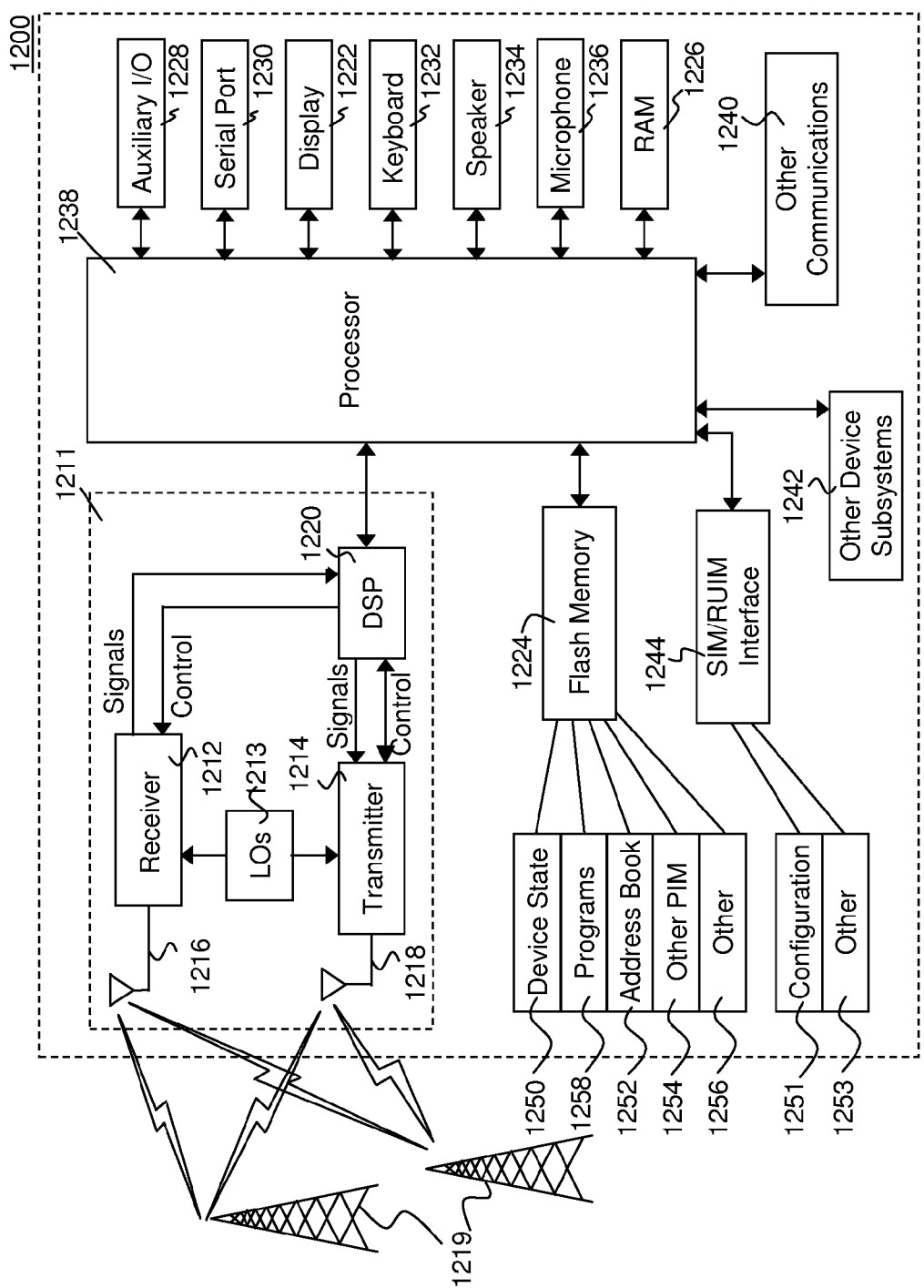
FIG. 12 is a block diagram of an exemplary mobile device capable of using the radio frequency front end of the present disclosure.

When required network registration or activation procedures have been completed, mobile device 1200 may send and receive communication signals over the network 1219. As illustrated in FIG. 12, network 1219 can consist of multiple base stations communicating with the mobile device. For example, in a hybrid CDMA 1×EVDO system, a CDMA base station and an EVDO base station communicate with the mobile station and the mobile device is connected to both simultaneously. Other examples of network technologies and base stations would be apparent to those in the art.

Signals received by antenna 1216 through communication network 1219 are input to receiver 1212, which may perform such common receiver functions as signal amplification, frequency down conversion, filtering, channel selection and the like, as shown in FIGS. 3, 5, 6 and 7. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

Mobile device 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the mobile device. A predetermined set of applications that control basic operations, including at least data and voice communication applications for example, will normally be installed on mobile device 1200 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 1219. In one embodiment, the PIM data items are seamlessly integrated, synchronized and updated, via the wireless network 1219, with the mobile device user's corresponding data items stored or associated with a host computer system. Further applications may also be loaded onto the mobile device 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both. For example, secure communication applications may enable electronic commerce functions and other such financial transactions to be performed using the mobile device 1200.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of mobile device 1200 may also compose data items such as email messages for example, using the keyboard 1232, which may be a complete alphanumeric keyboard or telephone-type keypad, among others, in conjunction with the display 1222 and possibly an auxiliary I/O device 1228. Such composed items may then be transmitted over a communication network through the communication subsystem 1211.

For voice communications, overall operation of mobile device 1200 is similar, except that received signals would typically be output to a speaker 1234 and signals for transmission would be generated by a microphone 1236. Alternative voice or audio I/O subsystems, such as a voice message recording subsystem, may also be implemented on mobile device 1200. Although voice or audio signal output is preferably accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type mobile device for which synchronization with a user's desktop computer (not shown) may be desirable, but is an optional device component. Such a port 1230 would enable a user to set preferences through an external device or software application and would extend the capabilities of mobile device 1200 by providing for information or software downloads to mobile device 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the mobile device to a computer to act as a modem.

Other communications subsystems 1240, such as a short-range communications subsystem, is a further optional component which may provide for communication between mobile device 1200 and different systems or devices, which need not necessarily be similar devices. For example, the subsystem 1240 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A radio frequency front end of a receiver comprising:
a tunable filter for receiving a signal;
a controller for tuning the tunable filter; and
an interference detection circuit comprising:
    a power detector for detecting interference exceeding a threshold and causing an interrupt at said controller; and
    a frequency detector for detecting a frequency of interference, said frequency detector providing an input to said controller, wherein said controller tunes said tunable filter in response to the interrupt and based on the input from said interference detection circuit.

2. The radio frequency front end of claim 1, wherein said tunable filter is a notch filter.

3. The radio frequency front end of claim 1, wherein said power detector and frequency detector are analog circuits.

4. The radio frequency front end of claim 1 wherein the frequency detector is a digital circuit.

5. The radio frequency front end of claim 1 wherein the power detector is a digital circuit.

6. The radio frequency front end of claim 1 wherein the power detector is a saturation detection circuit.

7. The radio frequency front end of claim 6, wherein the saturation detection circuit is used to detect saturation of at least one of a radio frequency amplifier and a mixer.

8. The radio frequency front end of claim 1 wherein the controller includes a control line to turn on said frequency detector upon receiving said interrupt from said power detector.

9. The radio frequency front end of claim 1 wherein the controller uses a look up table to tune said tunable filter.

10. The radio frequency front end of claim 1, further comprising at least one additional tunable filter, the at least one additional tunable filter being cascaded with the first tunable filter to cancel further interference sources.

11. The radio frequency front end of claim 1, further comprising a tunable duplexer for tuning the signal prior to the tunable filter.

12. The radio frequency front end of claim 1, wherein the receiver forms part of a mobile device.

13. A method for removing interference at a radio frequency front end of a receiver, the method comprising:
   detecting interference at an interference detection circuit, the detecting comprising:
      finding, at a power detector, whether interference power exceeds a threshold; and
      if interference power exceeds the threshold, determining, at a frequency detector, the frequency of the interference; and
   tuning at least one tunable filter to the frequency of the detected interference.

14. The method of claim 13, wherein a controller receives an interrupt upon the detecting of interference power exceeding a threshold, said controller tuning the at least one tunable filter.

15. The method of claim 14, further comprising activating said frequency detector from said controller upon receiving said interrupt from said power detector.

16. The method of claim 14 wherein the controller uses a look up table to tune said at least one tunable filter.

17. The method of claim 13, wherein said at least one tunable filter is a notch filter.

18. The method of claim 13, wherein said power detector and frequency detector are analog circuits.

19. The method of claim 13 wherein one or both of the frequency detector and the power detector are a digital circuits.

20. The method of claim 13 wherein the power detector is a saturation detection circuit.

21. The method of claim 13, further comprising tuning a signal to a desired band, prior to the detecting, using a tunable duplexer.

22. The method of claim 13, further comprising excluding a high in-band desired signal from the determination of interference power at the power detector.

* * * * *